United States Patent
Venkatachary et al.

(10) Patent No.: US 7,437,354 B2
(45) Date of Patent: Oct. 14, 2008

(54) ARCHITECTURE FOR NETWORK SEARCH ENGINES WITH FIXED LATENCY, HIGH CAPACITY, AND HIGH THROUGHPUT

(75) Inventors: Srinivasan Venkatachary, Sunnyvale, CA (US); Pankaj Gupta, Palo Alto, CA (US); Anand Rangarajan, Sunnyvale, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 895 days.

(21) Appl. No.: 10/841,607

(22) Filed: May 7, 2004

(65) Prior Publication Data
US 2004/0249803 A1 Dec. 9, 2004

Related U.S. Application Data

(60) Provisional application No. 60/476,033, filed on Jun. 5, 2003.

(51) Int. Cl.
*G06F 17/30* (2006.01)
(52) U.S. Cl. .................. 707/3; 707/204; 707/1; 707/2
(58) Field of Classification Search .............. 707/2–5
See application file for complete search history.

(56) References Cited

U.S. PATENT DOCUMENTS

| | | | |
|---|---|---|---|
| 6,154,384 A | 11/2000 | Nataraj et al. | |
| 6,192,051 B1 | 2/2001 | Lipman et al. | |
| 6,215,816 B1 | 4/2001 | Gillespie et al. | |
| 6,223,172 B1 | 4/2001 | Hunter et al. | |
| 6,307,855 B1 | 10/2001 | Hariguchi | |
| 6,385,649 B1 | 5/2002 | Draves et al. | |
| 6,611,832 B1 * | 8/2003 | van Lunteren | 707/3 |
| 2002/0089937 A1 | 7/2002 | Venkatachary et al. | |
| 2002/0147721 A1 | 10/2002 | Venkatachary et al. | |

FOREIGN PATENT DOCUMENTS

WO   WO 2004/088548   10/2004

OTHER PUBLICATIONS

Lampson et al., "IP Lookup using Multiway and Mulcicolumn Search," Aug. 1997, pp. 1-23.
Gupta, "Algorithms for Routing Lookups and Packet Classification," Dec. 2000, pp. 1-197.
Akhbarizadeh et al., "Reconfigurable Memory Architecture for Scalable IP Forwarding Engines," Proceedings 11th Int'l Conf. On Computer Communications & Networks, Oct. 2002, pp. 432-437.
International Search Report, PCT/US2004/018235, mailed Mar. 7, 2005.

* cited by examiner

*Primary Examiner*—Yicun Wu
(74) *Attorney, Agent, or Firm*—Shemwell Mahamedi LLP

(57) ABSTRACT

An improved architecture for a network search engine (NSE) is disclosed herein as including an interface manager, one or more levels of a splitting engine, an array of data processing units (DPUs), and a cascade block. A method for using the improved NSE architecture to form an efficient pointer entry database is also provided. As described herein, the improved NSE architecture simultaneously provides high speed, search throughput, update rate and capacity, coupled with low power and fixed latency searches for all search key widths.

8 Claims, 7 Drawing Sheets

NSE ARCHITECTURE

NSE ARCHITECTURE

SPLITTING ENGINE ARCHITECTURE

SINGLE DPU ARCHITECTURE

ARCHITECTURE FOR NETWORK SEARCH ENGINES WITH FIXED LATENCY, HIGH CAPACITY, AND HIGH THROUGHPUT

PRIORITY AND RELATED APPLICATIONS

This application claims benefit of priority to a provisional patent application Ser. No. 60/476,033, filed Jun. 5, 2003, which is hereby incorporated in its entirety. This invention also relates to co-pending application Ser. Nos. 10/402,887 entitled "System and Method for Efficiently Searching a Forwarding Database that is Split into a Bounded Number of Sub-Databases having a Bounded Size," and 10/809,244 entitled "Network Device, Carrier Medium and Methods for Incrementally Updating a Forwarding Database that is Split into a Bounded Number of Sub-Databases having a Bounded Size," both by common inventors Pankaj Gupta and Srinivasan Venkatachary, both of which are hereby incorporated in their entirety.

BACKGROUND OF THE INVENTION

1. Field of the Invention

This invention relates to computer networking. More particularly, the invention relates to the use of network search engines (NSEs) for packet classification and forwarding.

2. Description of the Related Art

Computer networking is generally recognized as the communication of packets across an interconnected network of computers. One objective of networking is to quickly forward the packets from a source to a destination. Thus, one or more forwarding devices may be placed within the network for performing such a function. As used herein, the term "forwarding devices" can be used interchangeably to refer to gateways, bridges, switches, or routers.

A forwarding device typically includes a lookup table (or "routing table") containing a representation of at least a portion of the network topology, as well as current information about the best known paths (or "routes") from the forwarding device to one or more destination addresses. For example, a forwarding device may store address prefixes (or "prefix entries") and next hop identifiers in a routing table. The prefix entries generally represent a group of destination addresses that are accessible through the forwarding device, whereas next hop identifiers represent the next device along the path to a particular destination address. Other information may be stored within the routing table, such as the outgoing port number, paths associated with a given route, time out values and one or more statistics about each route.

When an incoming address is received by a forwarding device, the address is compared to the prefix entries stored within the routing table. If a match occurs, the packet of information associated with the address is sent to an appropriate output port of the forwarding device. As links within the network change, routing protocols sent between the forwarding devices change the prefix entries within the corresponding routing tables. This change will not only modify the prefix entries within the routing table, but also the next-hop identifiers pointed to by those prefix entries. Thus, routing through the forwarding devices can be dynamically changed (i.e., updated) as links go down and come back up in various parts of the network.

The Internet Protocol (IP) is the protocol standard most widely used for packet communication to and from the Internet. Internet Protocol (IP) addresses associated with a packet generally comprise a network field (for identifying a particular network) and a host field (for identifying a particular host on that network). All hosts on the same network will have the same network field but different host fields. The number of bits dedicated to the network and host fields may vary from class to class in a class-based Internet addressing architecture. With the advent of Classless Inter-Domain Routing (CIDR), a classless addressing architecture, the boundary between the network field and the host field may also vary.

In addition to class-based and classless addressing architectures, there are currently several versions of IP addressing. For instance, IP version 4 (IPv4) uses a 32-bit addressing prefix, whereas IP version 6 (IPv6) uses a 128-bit addressing prefix. If, for example, IPv4 addressing is used, the forwarding device might only consider the first 8, 16 or 24 bits of the 32-bit addressing field in determining the next hop. The number of bits considered by the forwarding device may be referred to herein as the prefix length (p).

A popular way to determine the next hop is to use a technique known as longest-matching prefix. In this technique, a 32-bit IP address of, for example, 192.2.8.64 is compared against a prefix entry (or "prefix") within the routing table. The prefix 192.2.0.0/16 has a longer matching prefix than prefix 192.0.0.0/8. This is due primarily to the prefix length in the former being 16 bits, and the prefix length in the latter being only 8 bits. When employing the longest matching prefix technique, the forwarding device will initially consider the first two bytes of 192.2* to determine the next hop address at which to send the packet.

There are many ways to perform a longest-matching prefix comparison. For example, pointers or hashes may be used to divide the routing table into a plurality of sub-databases, each representing a different route through the network. To locate individual sub-databases, the first few bits of a binary prefix entry can be stored as a pointer within a pointer table. Each pointer entry keeps track of the prefixes within a particular sub-database, and points to subsequent binary entries needed to complete the longest prefix match. Unfortunately, many routes (empty routes) pointed to by the pointer entry may never be used (i.e., never compared with the incoming address). Moreover, while some routes (sparse routes) might seldom be used, other routes (dense routes) are used more often. While pointers will point to possibly hundreds of prefixes within the sub-databases, many sub-databases may be empty or sparse of any prefix entries matching the incoming addresses. Dividing a database of prefixes using precursor pointers, while heuristic, does not assure that the databases will be optimally divided.

Another technique used to divide a database may involve the use of a tree (or "trie") structure. There are many different tree configurations. A simple tree is often referred to as a binary tree, with more complex trees being compressed forms of the binary tree. To search for an address within a tree, the search begins at a root node. Extending from the root node, a "1" pointer or a "0" pointer is followed to the next node, or the next binary bit position, within the tree. If, for example, the address begins with 001*, then the search begins at the root node and proceeds downward to each vertex node, beginning along the "0" branch pointer to the next "0" branch pointer, and finally to the "1" branch pointer. The search will continue until a leaf node is reached or a failure occurs. In some cases, the binary tree may be compressed to enhance the search operation. A Patricia tree is one form of compression used to shorten the length of a branch to having relatively few leaf nodes.

One disadvantage of the longest-matching prefix search techniques described above is that their algorithms do not take into account that certain sub-databases or branches may rarely be searched while others are predominantly searched.

While a tree proves helpful in locating prefixes within the leaf nodes, a precondition of searching a tree is that before the next node can be fetched, the previous nodes must be retrieved. Empty or sparse routes may, therefore, result in a relatively slow search, and thus, a relatively slow lookup operation.

The speed with which a search or lookup operation is performed could be increased if the prefix entries within each node (or searchable sub-database) were more optimally apportioned. Co-pending application Ser. No. 10/402,887 describes a system and method for configuring sub-databases within the overall forwarding database of the routing table. Generally speaking, the co-pending application describes how a forwarding database may be optimally apportioned by placing bounds on the number of prefixes within each sub-database, and bounds on the number of sub-databases within the routing table. By controlling the number of sub-databases and the sizes of the sub-databases, lookup operations are more deterministic, and worst-case lookup times can be guaranteed. Moreover, the bounded number of sub-databases can be more optimally apportioned to a physical device, such as a memory, with dedicated portions of the memory appropriately sized to accommodate a corresponding sub-database. This may ultimately lessen the amount of power consumed by the lookup operation since only one sub-database need be accessed during a particular lookup.

Routing protocols, such as the Border Gateway Protocol (BGP) or the Open Shortest Path First (OSPF) protocol, compute routing tables on the basis of the network topology—e.g., the routers forming the network, the connectivity graph of the intervening links, and the distance between the routers in terms of the number of hops. As used herein, the term 'routers' will also be interpreted to include 'switches' and any other devices deemed to be "forwarding devices". Since routing tables are intended to reflect current network conditions, routing tables must be changed or updated as the network topology changes, which happens, e.g., when routers and links fail or come back up. These changes are usually incremental modifications (e.g., adds or withdrawals) to the current routing table at an affected router, and are referred to herein as "route updates".

To reflect a change in network topology, the following steps may be performed by an affected router (or another "forwarding device"). In a first step, the routing protocol (such as BGP or OSPF) is used to recompute the affected routes. This recomputation is performed by protocol software in the control plane of the affected router(s), and typically uses a shortest path routing algorithm. However, the recomputation may take a substantial amount of time to "converge" (i.e., to return the best match). For example, the performance of the first step may depend on the exact change in network topology and the routing protocol under deployment.

Most modern routers use a different version of the routing table, called a "forwarding table", which is computed from the routing table by the forwarding software in the control plane, and then downloaded to hardware components in the data plane for faster processing of data packets. Therefore, any changes made to the routing table, need to be reflected in the forwarding table in the router hardware. This constitutes a second step in the update process. Data packets passing through the affected router can then use the new routes in the updated forwarding tables.

The performance of the second step generally depends on the mechanism by which the forwarding table is computed and updated from the routing table, and is directly determined from the particular forwarding solution being used. A variety of forwarding solutions are currently used to store and search for routes in the forwarding table. For example, a network search engine (NSE), such as a TCAM-based (Ternary Content Addressable Memory) search engine, may be used for storing and searching through the forwarding table. Other network search engines may be implemented as off-chip memory with either (i) on-chip custom-designed logic, or (ii) software running on a specialized packet processor for implementing one or more forwarding algorithms. An off-the-shelf search engine may also be used for running one or more forwarding algorithms and may include embedded memory for storing routes.

Conventional architectures used for NSEs allow a system designer to trade-off certain parameters, such as power consumption, throughput, capacity, update rate and latency, when tailoring the search engine to a particular application. Because these parameters are traded against each other, however, conventional architectures do not permit a system designer to achieve desirable values (such as, e.g., low power consumption, high throughput, high capacity, high update rates and fixed latency) for all of the parameters simultaneously. For example, a conventional TCAM-based NSE may demonstrate relatively high throughput, high update rates and fixed latency, but may also consume large amounts of power in doing so. Likewise, a conventional trie-based algorithmic NSE may have to sacrifice capacity to maintain high update rates and fixed latency. None of the conventional methods (whether algorithmic or not) are able to achieve high performance in all of the above-mentioned parameters simultaneously.

It would be desirable, therefore, to provide an NSE architecture that could simultaneously achieve low power, high capacity (including, e.g., high worst case capacity for specific applications of interest), high search throughput, high update rates and fixed search latency (for all search key widths). Conventional methods simply cannot achieve desirable values for all of the parameters mentioned above.

SUMMARY OF THE INVENTION

According to an embodiment of an improved network search engine architecture, the extensible algorithmic NSE architecture is described herein achieves low power, high capacity (including, e.g., high worst case capacity for specific applications of interest), high search throughput, high update rates and fixed search latency for all search key widths. The unique ability to achieve all these parameters simultaneously makes this a compelling search solution for forwarding table search.

According to one embodiment, an architecture for a network search engine (NSE) may include one or more levels of a splitting engine and an array of data processing units (DPUs). The splitting engine may be generally configured for dividing a database of prefix entries into multiple sub-databases, each bounded in size between a minimum value and a maximum value. The DPU array, on the other hand, may be coupled to the splitting engine for storing the multiple sub-databases.

In some cases, the one or more levels of the splitting engine may be further configured for forming a hierarchical tree structure of the database. For example, the hierarchical tree structure may be formed to include a plurality of nodes extending between a root node and a plurality of leaf nodes. Each of the plurality of leaf nodes corresponds to one of the multiple sub-databases of prefix entries stored within the DPU array.

In some cases, the one or more levels of the splitting engine may form the hierarchical tree structure by assigning a pointer entry to each of the plurality of nodes within the hierarchical tree structure. At least one storage device may be included within the splitting engine for storing at least some of the pointer entries. For example, the storage device may be selected from a group comprising: logic gates and registers, Content Addressable Memory (CAM or TCAM), Random Access Memory (SRAM or DRAM), flash memory and magnetic memory. If the splitting engine includes only one level, the splitting engine may be configured for storing only the pointer entries, which are assigned to the plurality of leaf nodes, within a single pointer table.

If the splitting engine comprises more than one level, however, the splitting engine may be configured for storing all of the pointer entries within multiple pointer tables. For example, the splitting engine may form a different pointer table for each set of pointer entries that reside at each level of the hierarchical tree structure. In some cases, the same or a different type of storage device may be used for implementing each level of the splitting engine. Regardless, a first portion of the pointer entries may be stored within a first level of the splitting engine in a first storage device, a second portion of the pointer entries may be stored within a second level of the splitting engine in a second storage device, and a third portion of the pointer entries, overlapping the first and second portions, may be stored within the first and the second storage devices.

In one aspect of the invention, each of the pointer entries residing within the first and third portions may include a number of bits that is dependent on the level of the hierarchical tree structure at which the pointer entries respectfully reside. In a similar manner, each of the pointer entries residing solely within the second portion may include a number of bits, which are equal to the level of the hierarchical tree structure at which the pointer entries reside minus a number of bits contributed to a parent pointer entry residing within the third portion. In other words, the pointer entries residing within the second level of the splitting engine may have one or more of its 'most significant bits' (msb) "lopped off" to reduce the storage requirements within the second level.

The NSE architecture may also include an interface manager and a cascade block. The interface manager may be generally configured for translating a search instruction into a search key and sending the search key to the splitting engine, which responds by sending the search key and a corresponding pointer entry to the array of data processing units.

In some embodiments, the array of data processing units (DPUs) may include one or more DPU blocks, where each block includes a data storage sub-block, a data extractor sub-block and a data processor sub-block. The data storage sub-block may be configured for storing one or more of the multiple sub-databases of prefix entries, or at least a portion thereof. Each sub-database within the data storage sub-block may be associated with a unique pointer entry. In some cases, only the bits that follow the unique pointer entries may be stored as prefix entries within the data storage sub-block to reduce storage requirements. The data storage sub-block may include a storage device selected from a group comprising: Content Addressable Memory (CAM or TCAM), Random Access Memory (SRAM or DRAM), Flash Memory and Magnetic Memory.

The data extractor sub-block may be configured for receiving the pointer entry sent from the splitting engine. If the received pointer entry points to a sub-database within the data storage sub-block, the data extractor sub-block may extract the sub-database pointed to by the pointer entry. In some embodiments, the data extractor sub-block may be further configured for transforming the extracted sub-database into a format that can be read by the data processor sub-block. The data processor sub-block may be generally configured for determining if a sub-database has been extracted from the data storage sub-block, and if so, whether the extracted sub-database contains a prefix entry matching the search key sent from the interface manager.

In most cases, the data extractor sub-block and the data processor sub-block may be implemented as either hard-coded or programmable logic blocks. If the data processor sub-block comprises a hard-coded logic block, the data extractor sub-block may transform the extracted sub-database into a format that enables the data processor sub-block to process the extracted sub-database with a minimum amount of logic. If the prefix entries are stored within the data storage sub-block as compressed data, however, the data extractor sub-block may transform the extracted sub-database by decoding the prefix entries within the extracted sub-database.

According to another embodiment, a method for forming a pointer entry database is described herein. The pointer entry database may be used for locating a prefix entry within a forwarding database that has been split into multiple sub-databases of bounded size and number. In general, the method may begin by forming a hierarchical tree structure of the forwarding database. As noted above, for example, the hierarchical tree structure may include a plurality of nodes extending between a root node and a plurality of leaf nodes, where each of the plurality of leaf nodes corresponds to one of the multiple sub-databases.

The method may also include assigning a pointer entry to each of the plurality of nodes within the hierarchical tree structure, and storing first and second sets of the pointer entries within first and second portions of the pointer entry database, respectively. For example, the first set of pointer entries may be configured for locating a child pointer entry within the first or second portions of the pointer entry database. On the other hand, the second set of pointer entries may be configured for (i) locating a child pointer entry within the second portion of the pointer entry database or (ii) locating the prefix entry within one of the multiple sub-databases.

In some cases, the first set of the pointer entries may each include a number of bits that is dependent on the level of the hierarchical tree structure at which the pointer entries reside. However, the second set of the pointer entries may each include a number of bits equal to the level of the hierarchical tree structure at which the pointer entries reside minus a number of bits contributed to a parent pointer entry residing within the first set of pointer entries.

According to yet another embodiment, a method for improving the performance of a network search engine (NSE) is described herein. In general, the method may begin by using one or more levels of a splitting engine to narrow down a search space within the NSE. To do so, the splitting engine may be used to (i) divide a database of prefix entries into multiple sub-databases, each bounded in size between a minimum value and a maximum value, and (ii) after using a search key for searching through one level of the splitting engine, searching only a remaining portion of the search key in a lower level of the splitting engine, or in one of the multiple sub-databases, to reduce power consumption and search latency in the NSE.

In some cases, the step of using one or more levels of a splitting engine to narrow down a search space may include forming a hierarchical tree structure of the database, where the hierarchical tree structure comprises a plurality of nodes extending between a root node and a plurality of leaf nodes, and where each of the plurality of leaf nodes corresponds to one of the multiple sub-databases of prefix entries. The step may also include forming a pointer entry database by assigning a pointer entry to each of the plurality of nodes within the hierarchical tree structure.

In some cases, the method may further include using different methods to search through the pointer entry database created by the splitting engine. For example, the different methods available for use may include a binary search, a trie search, a linear search or a parallel search of the pointer entry database.

In some cases, the method may further include achieving fixed latency searches for all search key widths. This may be achieved, for example, through the use of fixed latency memory blocks for storing the pointer entry database and the multiple sub-databases.

In some cases, the method may further include separating data storage and data processing operations through use of a data extractor. Such separating may improve the performance of the NSE by allowing compressed data to be stored in the database and the use of a hard-coded data processor.

BRIEF DESCRIPTION OF THE DRAWINGS

Other objects and advantages of the invention will become apparent upon reading the following detailed description and upon reference to the accompanying drawings in which.

Figure 1:
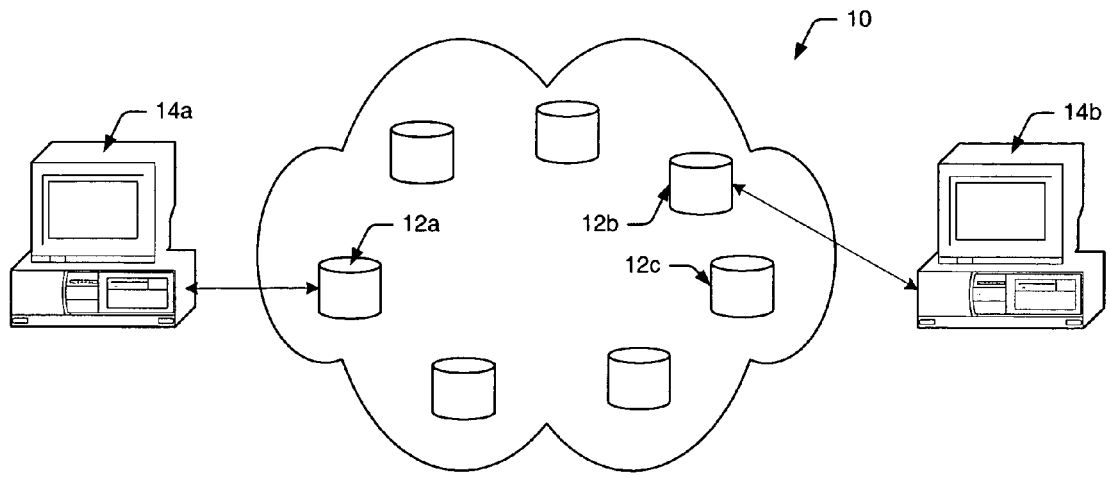
FIG. 1 is a block diagram of a communication network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Although the term "network" is specifically used throughout this disclosure, the term network is defined to include the Internet and other network systems, including public and private networks that use the Internet Protocol (IP) protocol suite for data transport. Examples include the Internet, Intranets, extranets, telephony networks ("using voice over IP"), and other wire-line and wireless networks that converge on the use of the IP family of protocols. Although the term "Internet" may be used throughout this disclosure, the term Internet is merely one example of an IP "network."

FIG. 1 illustrates possibly numerous forwarding devices 12 within a computer network 10. The topology of the Internet or the Intranet interposed between computers 14 can vary. If computer 14a wishes to send a packet of data to computer 14b, then it must do so by traversing one or more forwarding devices 12 within network 10. Forwarding device 12a might receive the packet, which includes a destination address of, for example, forwarding device 12b (or computer 14b). Determining where to send the packet within network 10 so that the packet arrives at a forwarding device (or hop) closer to the destination, is essentially the function of the routing table within the forwarding device 12a. Optimally, the routing table within forwarding device 12a will receive the destination address, and will compare that address (or "search key") to prefix entries within the routing table. Associated with each prefix entry might be a next hop identifier. Thus, once a prefix entry is found that matches (using, for example, the longest prefix match comparison) the destination address, the packet can be routed to the next hop to be one step closer to the intended destination.

Figure 2:
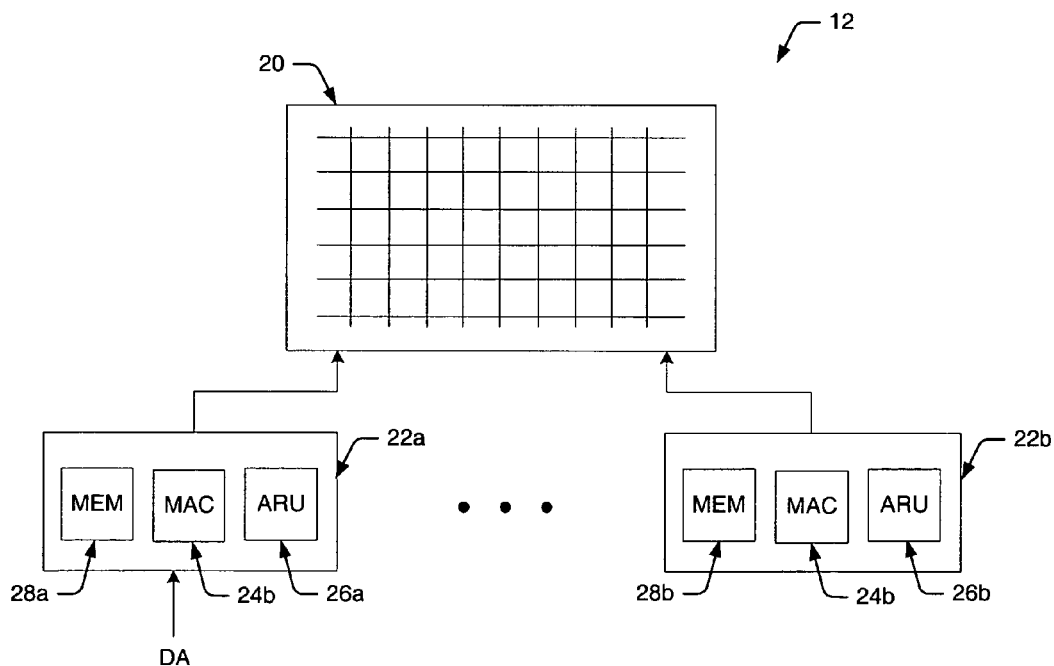
FIG. 2 is a block diagram of a packet-forwarding engine, or "forwarding device" (e.g., a switch or router) within the communication network of FIG. 1.

FIG. 2 illustrates one example of forwarding device 12, such as a router, gateway, bridge, or switch. Forwarding device 12 is often called a "packet-forwarding engine" and may contain a switching fabric 20 and a plurality of line cards 22. Switching fabric 20 is generally well known, and may involve a crossbar switch that interconnects all the line cards with one another. At least one line card may contain a routing processor. Forwarding device 12 can, therefore, be thought of as performing two functions: (i) performing route lookup based on the destination address of the packet in order to identify an outgoing port; and (ii) switching the packet to the appropriate output port.

The routing function can be performed primarily on the incoming line card (e.g., line card 22a), whereas switching of the packet to the appropriate output port or line card can take place within switching fabric 20. The Destination Address (DA) of the packet can enter line card 22a via an I/O interface. Each line card typically includes a Media Access Controller (MAC) 24, an Address Resolution Unit (ARU) 26, and a memory device 28. MAC 24 can be configured to accept many different communication protocols, such as, e.g., the Carrier Sense Multiple Access/Collision Detect (CSMA/CD), Fiber Distributed Data Interface (FDDI), or Asynchronous Transfer Mode (ATM) communication protocols. As packets are read from ingress MAC 24a, forwarding control information necessary for steering the packet through switching fabric 20 will be pre-pended and/or appended to those packets.

The ARU 26 at the ingress line card preferably performs the routing function using the longest prefix match comparison technique. The ARU can perform classless or class-based routing functions and can support Variable Length Subnet Masks (VLSM). Each ARU can be reconfigured—as routes are added or deleted from the network—using well-known routing protocols, such as OSPF, or BGP. The memory device 28 can be implemented in various types of Random Access Memory (RAM), such as DRAM, SRAM, or Content-Addressable Memory (CAM), a popular form of masking CAM being Ternary CAM (or TCAM). Memory 28 may contain various lookup tables. For example, memory 28 may contain one or more of the following lookup tables: a pointer table, a routing table and a next hop table. If one or more of the lookup tables are copied and placed within the line card 22, lookups on incoming packets can be performed locally, without loading the central processor of forwarding device 12. As used herein, a local copy of a lookup table may be referred to as a "forwarding table," and may be stored in a memory device not shown in FIG. 2.

Figure 3:
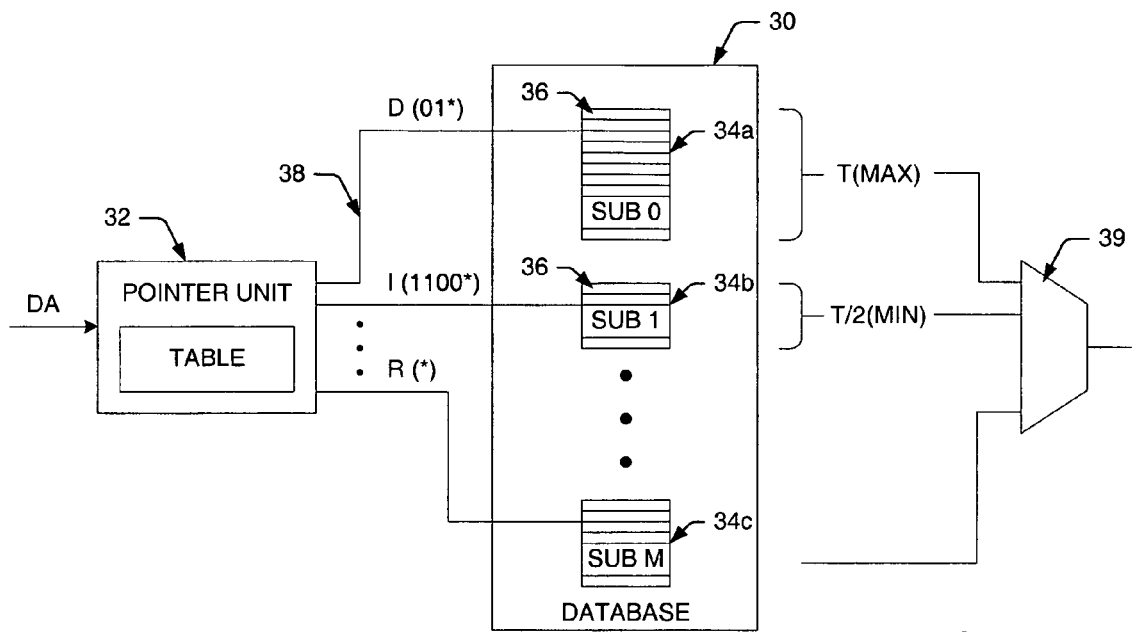
FIG. 3 is a block diagram of a forwarding database, a pointer unit that points an address to a corresponding sub-database within the forwarding database, and a selection unit that selects a next hop address corresponding to the chosen sub-database.

FIG. 3 illustrates an exemplary configuration (or architecture) of the lookup tables described above. More specifically, FIG. 3 illustrates how a pointer unit may be used to match an incoming destination address (DA) to a corresponding sub-database (SDB) by matching more significant bits of the address to prefixes within the pointer table, and then matching less significant bits of the address to prefixes within the sub-database pointed to by the pointer unit. The routing table is shown in FIG. 3 as forwarding database 30 and is preceded by a pointer unit 32. Database 30 is bifurcated or split into a plurality of sub-databases 34. A mechanism that may be used to split database 30 into sub-databases 34 will be described below with regard to FIG. 6. Moreover, an example will be provided to illustrate how the number of prefixes within each sub-database is bounded between a maximum prefix amount, or threshold "T," and a minimum prefix amount, or threshold "T/2." Thus, FIG. 3 illustrates a sub-database 34a that might have a maximum number of prefixes 36. Sub-database 34b might have a minimum number of prefixes 36. Not only are the number of prefixes within each sub-database controlled, but the number of sub-databases 34 within database 30 is also controlled.

As part of the routing table, or preceding the routing table, is pointer unit 32. Pointer unit 32 can include a pointer table having a set of pointer entries. Each pointer entry within the pointer table may comprise a binary sequence that represents a branch (or "spear") to the appropriate unique binary sequence of a corresponding sub-database. For example, one pointer entry 38 might point to prefix 01*, where * represents a don't care (or "mask entry"). If the incoming address (DA) begins with 0 followed by 1, then pointer entry 38 will point to sub-database "D", which contains a bounded number of prefixes that begin with binary sequence 01, followed by a bounded range of other binary combinations. Another pointer entry (not labeled) may point to sub-database "I", shown as reference numeral 34b in FIG. 3. Sub-database "I" has a binary sequence beginning with 1100, with subsequent binary permutations contained in the number of prefix entries of sub-database "I". The set of pointers represented in the example of FIG. 3 as 01*, 1100*, and * are configured as part of the overall address resolution and are stored within the pointer table of pointer unit 32 for quickly locating a particular SDB. For this reason, the set of pointer entries stored within the pointer table of FIG. 3 may otherwise be referred to herein as "spear prefixes" or "spear entries".

Figure 4:
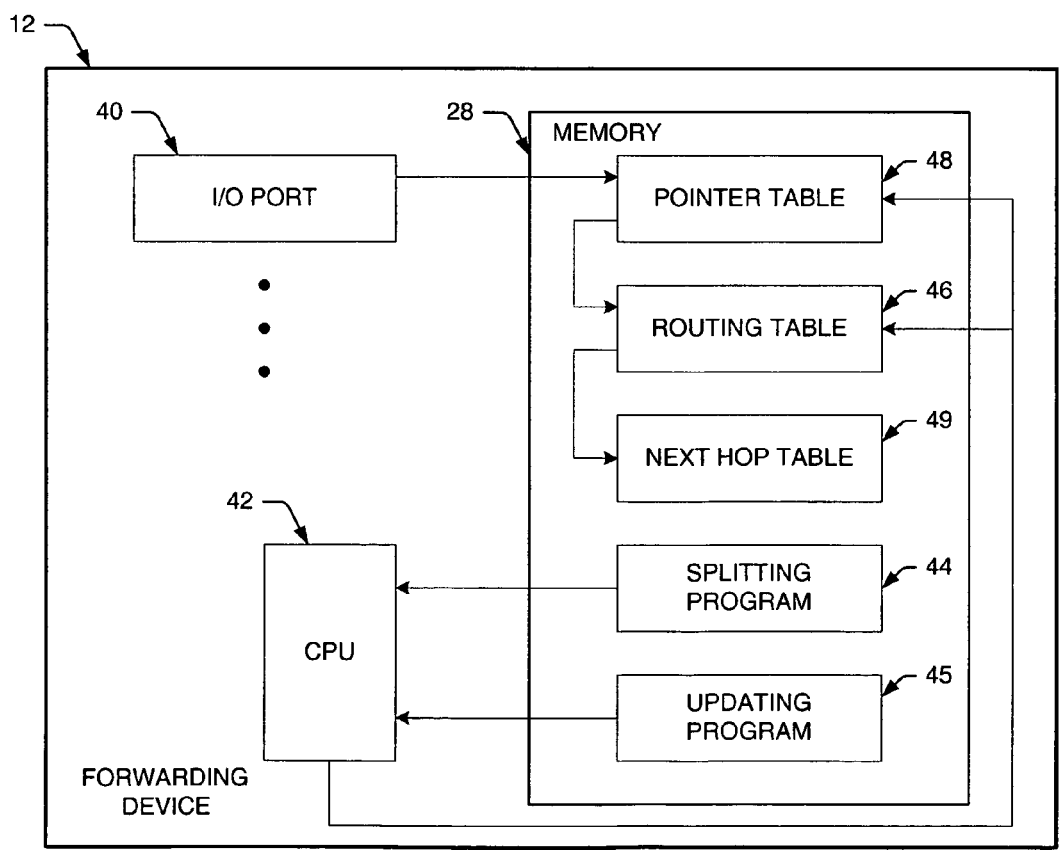
FIG. 4 is a block diagram of the forwarding device of FIG. 2, including a computer storage medium, a processor and multiple input/output ports.

FIG. 4 illustrates an exemplary memory allocation within a forwarding device 12. More specifically, FIG. 4 shows a block diagram of an exemplary computer storage medium 28 within the forwarding device that may be used to store a splitting program and one or more updating programs. As described in more detail below, splitting program 44 may be used by processor 42 to configure the pointer table 48 and the sub-databases within the routing table of FIG. 3. An updating program 45 may be subsequently selected for incrementally updating the routing table in an online fashion.

As shown in FIG. 4, forwarding device 12 includes multiple input/output ports 40 that communicate with other forwarding devices within the network. Processor 42 may be called upon to fetch a splitting program 44 stored within memory 28. When executed on processor 42, the forwarding database of the routing table may be split into sub-databases of bounded size and number. One mechanism by which the database may be split will be briefly described below.

In some embodiments, splitting program 44 may be used to divide (or "split") forwarding database 30 into a bounded number of sub-databases, each containing a bounded number of prefix entries. For example, the number of sub-databases may be bounded by NIT and 2N/T+1, where "N" is the total number of prefix entries in the forwarding database and "T" is the maximum number of prefix entries allowed in each sub-database. In some cases, the number of prefix entries within each sub-database may be bounded by, e.g., T/2 and T. Alternative bounding thresholds may be used in other cases. Reference can be made to co-pending application Ser. No. 10/402,887 for a more in-depth discussion of the exemplary splitting mechanism mentioned herein.

Once split, processor 42 may configure the sub-databases within routing table 46 and store the pointer entries within pointer table 48. When address searching is subsequently performed, the incoming address may initially be sent to pointer table 48 via I/O port 40. An appropriate pointer entry may then be selected based on a match of the longest prefix of the more significant binary bits of the incoming address. The selected pointer entry may point, therefore, to an appropriate sub-database within routing table 46. Another longest prefix match operation may be undertaken to determine the longest matching prefix within only that sub-database. Once determined, the longest-matching prefix may point to a corresponding next hop entry. As shown in FIG. 3, the outcome of the lookup operation may be sent to a selector, which may then select the next hop identifier recognizable by the switching fabric of FIG. 2. The next hop address selector is shown as reference numeral 39 in FIG. 3, and the next hop table stored in memory 28 is shown as reference numeral 49.

It is appreciated that each of the functional units described in FIGS. 2, 3 and 4 may be implemented with hardwired circuitry, Application Specific Integrated Circuits (ASICs), one or more logic circuits, a processor, or any components of a programmed computer that performs a series of operations dictated by software or firmware, or a combination thereof. Importantly, the present invention is not limited to a particular implementation of the functional units, and thus the functional units can achieve their functionality using either hardware, firmware or software.

Figure 5:
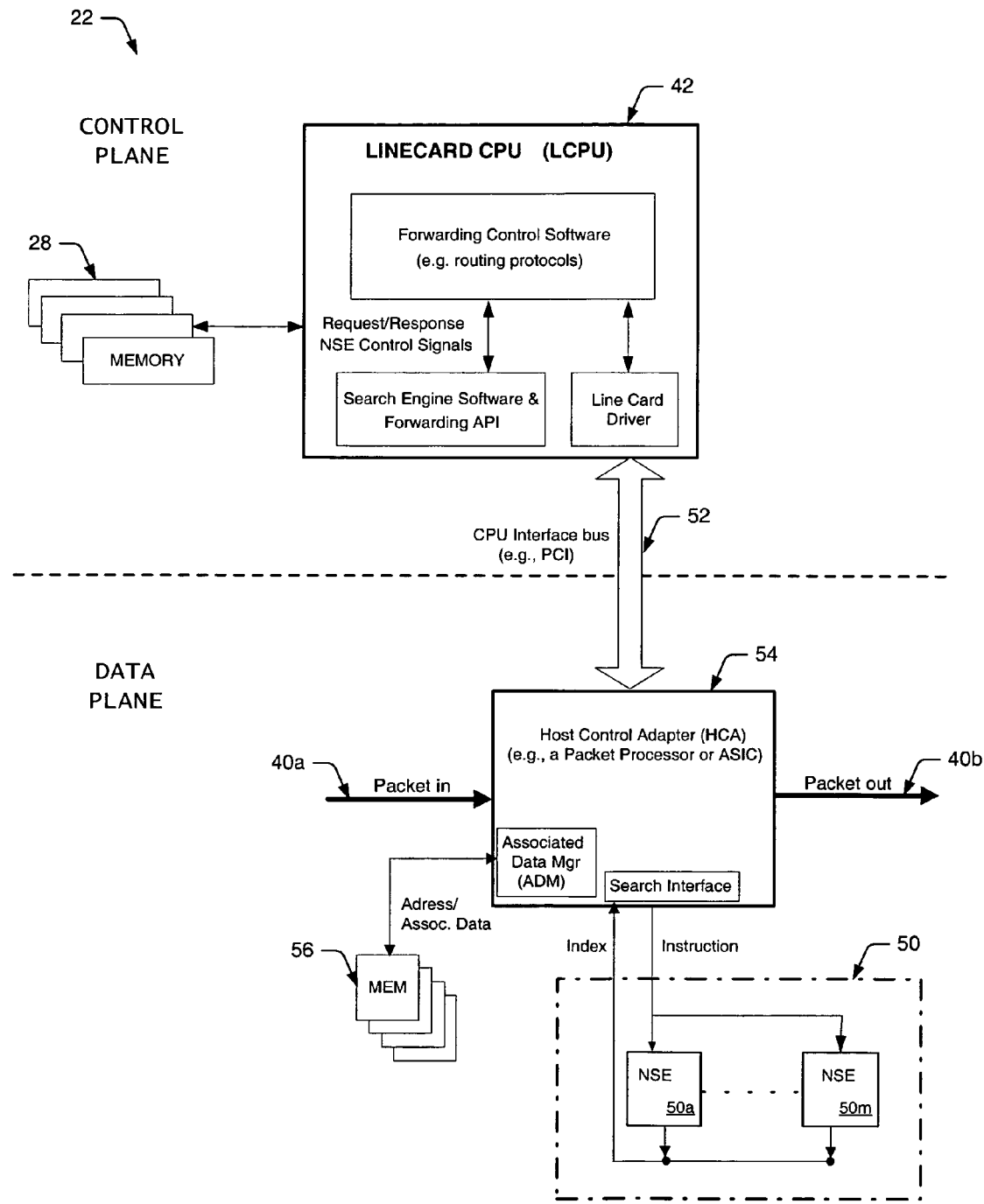
FIG. 5 is a block diagram of various software and hardware components that may be found within one or more line cards of the forwarding device of FIG. 2.

For example, FIG. 5 shows exemplary line card components that may be included within forwarding device 12 of FIGS. 2 and 4. In the following discussion, similar reference numerals will be used in describing components with similar counterparts in FIGS. 2-4.

In the embodiment of FIG. 5, line card 22 may contain a Network Search Engine, ("NSE") 50 in the data plane of the line card, and supporting components in the control plane of the line card. In some cases, a central processor 42 (referred to as line card CPU, or "LCPU") may be included within the control plane of line card 22 for managing the hardware components of the line card. For example, LCPU 42 may be configured to run the forwarding control software used to compute and maintain the routing tables within memory 28 and the forwarding tables within NSE 50. For this reason, LCPU 42 may be alternatively referred to as a "memory management device." The forwarding control software may be stored in control plane memory 28 (e.g., SRAM or DRAM) coupled to LCPU 42. The LCPU may communicate with other line card components using an interface bus 52 (such as a Peripheral Component Interconnect, PCI, bus) either directly, or via a Field Programmable Gate Array (FPGA) or Application Specific Integrated Circuit (ASIC) designed for this purpose.

Though a central processor (i.e., LCPU 42) is used herein for managing the forwarding database of a line card, such function should not be limited to a central processor in all embodiments of the invention. Other programmable units, such as, e.g., network processing units ("NPU") or Field Programmable Gate Arrays ("FPGA") could be replace LCPUR 42 in alternative embodiments of the invention.

As shown in FIG. 5, a Host Control Adapter (HCA) 54 may be included in the data plane of line card 22 for handling and processing the incoming data packets. HCA 54 could be, e.g., a custom-designed ASIC or a packet processor. The HCA is generally responsible for parsing the packets, extracting the search key (such as the destination address), and performing the lookup in the forwarding tables within the NSE, among other things.

In some embodiments, NSE 50 may be considered to include an array of NSE modules (50a . . . 50m), which are coupled to the HCA, in addition to the search engine software that runs on the LCPU and manages the NSE array. The NSE array can be implemented in a variety of configurations, such as one search engine subsystem (i.e., one NSE array) on each line card in a distributed architecture, or one search engine subsystem on a centralized card. In a distributed architecture, control plane processing may be required for computing the forwarding table from the routing table. The control plane processing can either be carried out independently on each line card, or on one centralized card.

As used here, the term "Network Search Engine" or "NSE" may refer to any device capable of: (i) storing a database of entries, (ii) using a search key to search for a particular entry within the database of entries and, as a result of the search, (iii) returning one or more indices of matching entries (i.e., entries that have at least one bit in common with the search key). The entries within the database can be "exact match entries" (e.g., complete IP destination addresses), "prefix entries" (e.g., one or more most significant bits of the IP destination address followed by a masked entry), or "lopped-off" prefix entries (e.g., prefix entries with one or more of their most significant bits replaced by a masked entry). Though the NSE architecture provided herein is primarily described in the context of networking applications (e.g., NSE 50 is included within a line card of a network forwarding device, such as a network router), the NSE architecture could be used in substantially any other database-related application (e.g., in which one wishes to efficiently search for a database entry).

To perform a search or lookup operation, NSE 50 may carry out a simple request-response transaction, usually once every clock cycle. To initiate a "search request," a read instruction may be sent from LCPU 42 for locating a search key within the forwarding table of the NSE array. The "search response" (sent after a fixed latency) is the index returned by the NSE array indicating the best matching route corresponding to that search key. The HCA may use the index to lookup (or locate) the attached memory device 56 (e.g., SRAM or DRAM) that contains any data associated with the best matching route(s). The HCA may then use the associated data to perform other packet processing functions.

To perform an update operation, the forwarding control software within LCPU 42 makes a "request" to add and/or withdraw routes to the search engine software through an Application Programming Interface (API). In most cases, the API may be a single-threaded, simple request-response library of function calls. The search engine software may be used to process the request, incrementally recompute the data structures, and generate a list of changes to be made in the NSE array as a result of the route updates made to the data structure in memory 28. These changes are essentially a set of update instructions (such as a 'write' instruction) to be reflected in the forwarding tables of the NSE array. This "update list" is returned to the forwarding control software as a "response" to the update request.

The search engine software also manages the index space associated with each route stored in the NSE array. Route updates that require changes to be made in the NSE array, could also cause changes to be made in other memory devices that may be attached to the HCA (e.g., associated memory device 56, or other NSEs or TCAMS). The changes made to other memory devices may also be computed by the search engine software and sent to the forwarding control software. All changes made, e.g., to the NSE array and to associated memory device 56, are consolidated as one logical stream of update requests and sent to the forwarding control software. In some cases, the forwarding control software may augment the logical stream before sending it to the line card driver software layer that sends the update requests over the LCPU interface bus to the HCA.

Once received by the HCA, the software update requests from the LCPU are forwarded to the NSE array or to the associated memory device (depending on the destination of the update request) and the appropriate updates are made. In most cases, searches within the NSE array may continue while the updates are being sent to the forwarding tables within the NSE array. In other words, the HCA is free to interleave search and update requests in any fashion. Reference can be made to co-pending application Ser. No. 10/809, 244 for a more in-depth discussion of a mechanism that may be used for updating the forwarding tables in an incremental, online fashion.

NSE architectures are typically designed with certain trade-offs in mind. For example, a conventional trie-based algorithmic NSE may sacrifice capacity to maintain high update rates and fixed latency searches. To date, the current inventors are unaware of any NSE architecture that does not require a trade-off between one or more of the following parameters: power consumption, throughput, capacity, update rate and search latency. In other words, conventional NSE architectures typically fail to achieve desirable values (such as, e.g., low power consumption, high throughput, high capacity, high update rates and fixed latency) for all parameters simultaneously.

Figure 6:
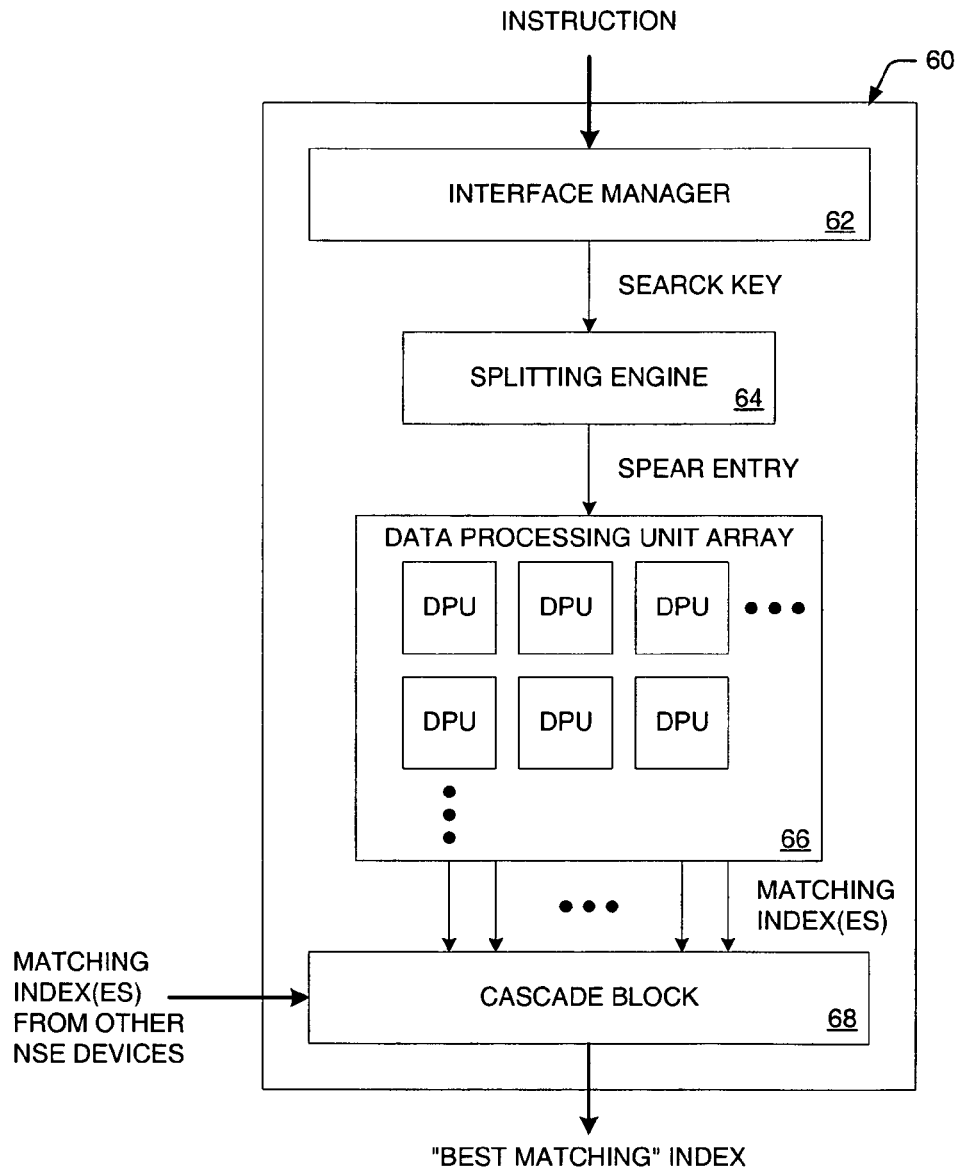
FIG. 6 is a block diagram of a network search engine (NSE) architecture including an interface manager, one or more levels of a splitting engine, a data processing unit (DPU) array, and a cascade block, according to one embodiment of the invention.

An embodiment of an improved network search engine (NSE) architecture is shown in FIG. 6. As will be described in more detail below, the improved architecture includes one or more levels of a splitting engine (64). The splitting engine described herein is used to implement a fixed latency NSE, which simultaneously achieves low power consumption, high capacity (including high worst case capacity for specific applications of interest), high search speed (i.e., low search latency) and high update rates for all search key widths. As described in more detail below, the improved architecture also includes an interface manager (62), an array of data processing units (DPUs) (66) and a cascade block (68). The DPU array may include one or more DPU blocks.

Generally speaking, the NSE architecture of FIG. 6 may be used to replace one of the NSE modules within the NSE array of FIG. 5. In other words, NSE array 50 may be formed by replicating the NSE architecture of FIG. 6, and then coupling the replicated architectures in a serial, parallel or ring configuration. As noted above, search (and/or update) operations may be performed by sending search (and/or update) instructions to the NSE array. The instructions may be read (and/or write) instructions and may be sent to all, or only some, of the NSE modules within the NSE array. Other types of instructions that may be sent to the NSE array include, e.g., copy instructions, burst instructions, and other "macro" instructions that perform a sequence of read, shift, copy, etc.

As shown in FIG. 6, interface manager 62 is generally configured for translating the search instruction(s) sent to the NSE array, and extracting the search key to be passed downstream to splitting engine 64. In the case of read or write commands, interface manager 62 may also pass on relevant data to memory device 56 of FIG. 5. In most cases, interface manager 62 may be implemented as hard-coded or programmable logic, as is known in the art.

Splitting engine 64 is generally configured for receiving the search key from interface manager 62 and using the search key to perform one or more of the following functions: (i) splitting a forwarding database into a plurality of smaller sub-databases bound in size and number, (ii) searching for a prefix entry stored within the forwarding database, and (iii) updating the forwarding database with one or more update instructions. The splitting engine is also configured for maintaining one or more pointer tables to narrow the scope of the search operation, enabling only one (or a few) of the NSE modules to be searched within the NSE array. As will be described in more detail below, the use of pointer tables greatly enhances the efficiency with which the search and update operations are performed in the NSE array.

Splitting engine 64 may respond to the search key by sending a corresponding pointer entry to one (or more) of the data processing units within the DPU array. Exemplary means for implementing splitting engine 64 will be described below in reference to FIG. 6. However, splitting engine 64 is generally configured to include one or more hierarchical levels. The hierarchical levels of splitting engine 64 are used to divide larger databases into smaller ones, thereby reducing the memory bandwidth and processing power requirements on downstream blocks (e.g., the DPU array and cascade blocks). As described in more detail below, implementing the splitting engine as a hierarchy also helps in increasing the capacity of the NSE modules.

The array of Data Processing Units (DPUs) may be considered the final block in the splitting engine hierarchy. In some cases, the individual blocks of the DPU array may operate in parallel to output results (i.e., "matching indices", or prefix entries having at least one bit in common with the search key) to cascade block 68. In other cases, the DPU blocks may be pipelined or chained together for outputting a single result to the cascade block. Exemplary means for implementing a single DPU block will be described below in reference to FIG. 7.

Cascade block 68 collates all of the results obtained from DPU array 66 to provide a single result (i.e., a "best match" index) for the NSE module. In some cases, a unique priority value may be associated with each block in the DPU array. To determine the "best match" index, cascade block 68 may compare the results obtained from the DPU array with the search key and output the matching index with the highest priority value.

In some cases, cascade block 68 may also include logic for comparing the results obtained from upstream NSE modules. In other words, each NSE module may receive results from an upstream NSE module. To receive the upstream results, the cascade blocks within each of the NSE modules may be coupled together in a serial, parallel or ring configuration. In some cases, for example, the cascade blocks may be coupled in parallel for receiving upstream results from other NSE modules (or from a shared memory) via a shared bus. Regardless of the particular manner in which the NSE modules are coupled, the NSE modules may each use the upstream results to determine if the result it generated is a "better" result than what was received from an upstream module. What constitutes a "better" result may depend, however, on the dataset and the semantics of the routes/table entries. For example, the 'metric' used to compare any two matching entries might be different for different databases. The "longest matching entry" is only one metric that may be used to search for a database entry. Other metrics may be used in alternative embodiments of the invention.

As noted above, one or more levels may be used to implement splitting engine 64. If only one level is used, splitting engine 64 may be constructed similar to the manner shown in FIG. 3. For example, splitting engine 64 may include pointer unit 32 and a pre-selection unit for selecting the appropriate pointer entry from pointer unit 32. Splitting engine 64 may also function similar to the manner described above in FIG. 3. For example, splitting engine 64 may construct and maintain a set of pointer entries within a pointer table of pointer unit 32. As described in reference to FIG. 9, the set of pointer entries may be used for locating one of the multiple sub-databases ("SDBs") formed from the division of forwarding database 30.

Figure 9:
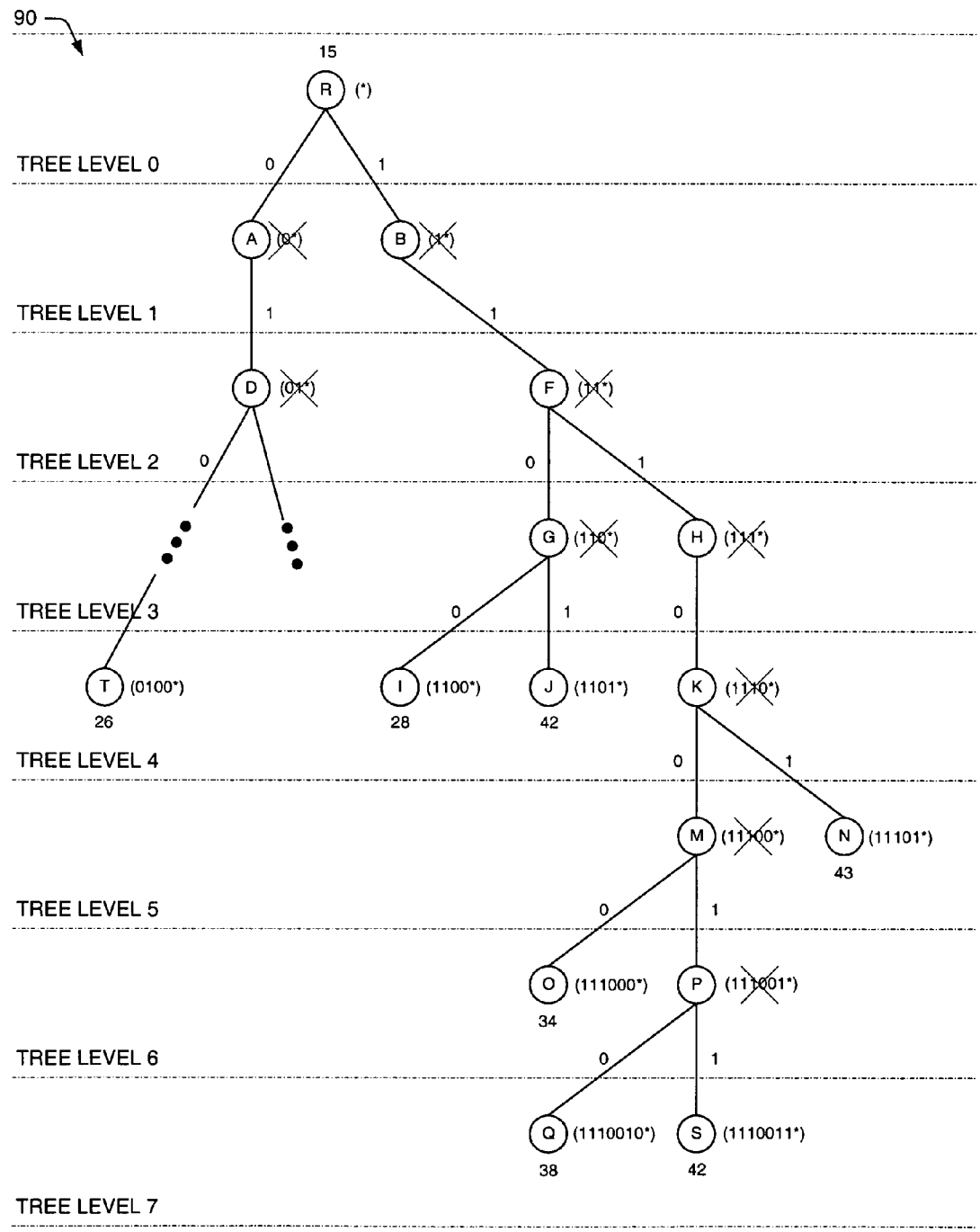
FIG. 9 is a plan diagram of an exemplary tree structure that may be formed when the splitting engine comprises only one level.
Figure 10:
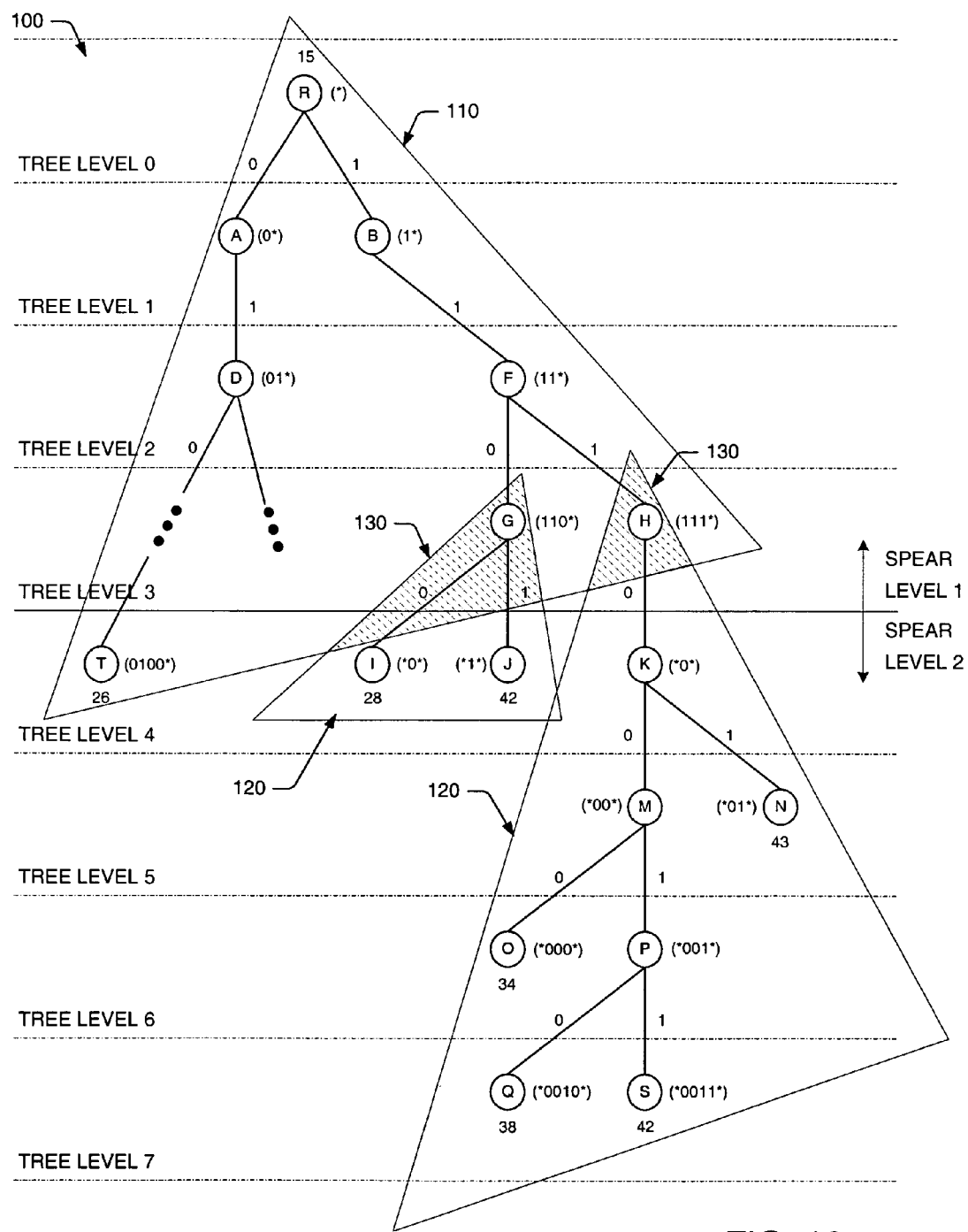
FIG. 10 is a plan diagram of an exemplary tree structure that may be formed when the splitting engine comprises two levels.

FIGS. 9 and 10 illustrate how splitting program 44 of FIG. 4 may utilize a binary tree to generate a plurality of pointer entries by dividing a database of prefix entries into a bounded number of sub-databases, each containing a bounded number of prefix entries. Other types of tree (or "trie") structures may be used in alternative embodiments of the invention.

As shown in FIG. 9, the prefix entries within forwarding database 30 (FIG. 3) can be represented in hierarchical tree structure 90. Each node or vertex of the tree structure comprises a unique pointer entry (represented by a binary string comprising 1s and 0s). The root node (R) is the null string represented as an asterisk (*). In a binary tree, two pointers may originate from each node (with the exception of leaf nodes). The first pointer consists of the current binary string plus a 0, whereas the second pointer consists of the current binary string plus a 1. Nodes in the upper or intermediate levels of the tree structure may have pointer entries that point to child nodes in lower levels of the tree structure. Nodes without any descendents (i.e., leaf nodes) may have pointer entries that point to sub-databases (SDBs) stored within the DPU array.

In the embodiment of FIG. 9, only those pointer entries that point to SDBs within the DPU array (e.g., the pointer entries at nodes R, I, J, N, O, Q, S, T, etc.) are stored within the pointer table of pointer unit 32. The set of pointer entries stored within pointer unit 32 may, therefore, be referred to as "spear prefixes" or "spear entries." Reference can be made to co-pending application Ser. No. 10/402,887 for a more in-depth discussion of splitting engine 64 when only one level is used.

Figures 7, 8:
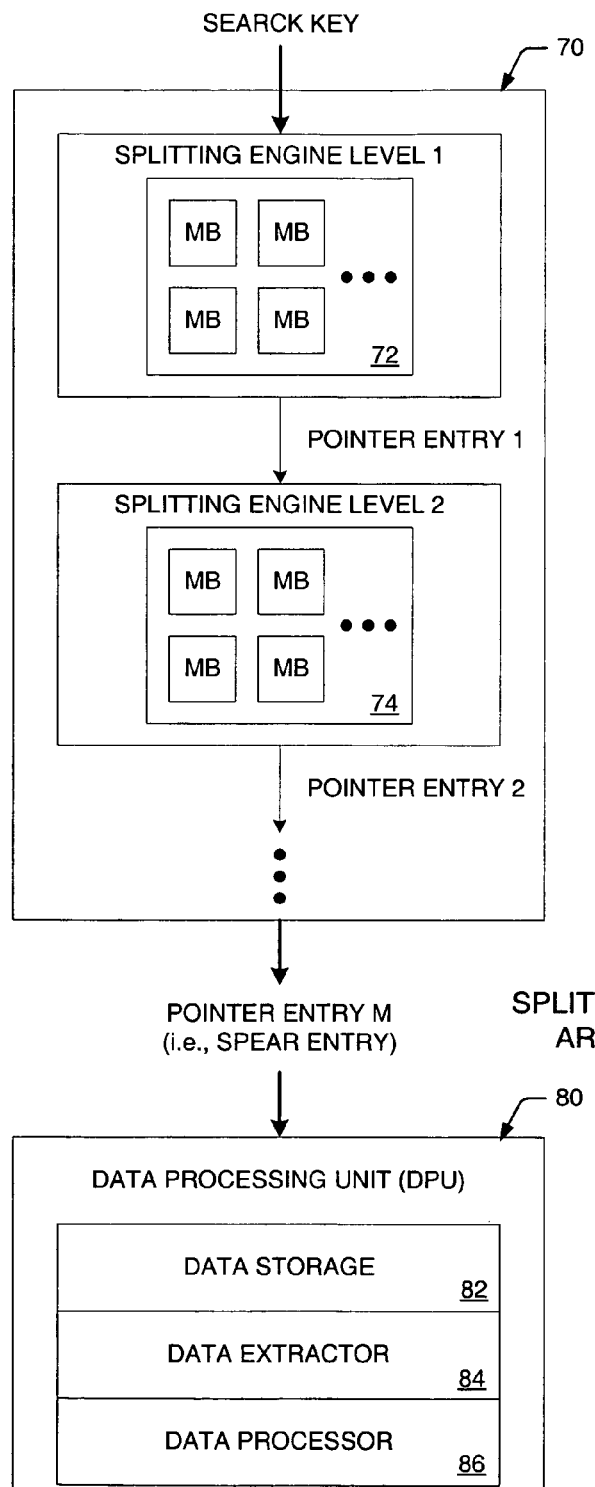
FIG. 7 is a block diagram of the splitting engine shown in FIG. 6, according to one embodiment of the invention.
FIG. 8 is a block diagram of an exemplary data processing unit (DPU) that may be included within the DPU array of FIG. 6.

FIGS. 7 and 10 illustrate the embodiment in which more than one level is used to implement the splitting engine. As shown in FIG. 7, splitting engine 70 may be divided into at least two (somewhat distinct) levels, where each level includes a storage device (or a portion thereof) and a logic block. In general, the logic block may be configured for choosing 'k' matching pointer entries based on some criteria, reading the appropriate pointer table contents and pass the chosen pointer entries onto the next level of splitting engine 70 or to the DPU array. In some cases, each level of splitting engine 70 may be implemented with the same type (or alternatively, a different type) of storage device. In other cases, two or more levels of splitting engine 70 may be implemented with the same type of storage device (or within separate portions of the same storage device), while other levels may be implemented with a substantially different type of storage device. Regardless, the type of storage device(s) used within splitting engine 70 may include, e.g., a block of logic gates and registers, Content Addressable Memory (CAM or TCAM), or Random Access Memory (SRAM or DRAM). Other types of storage devices may be used in alternative embodiments of the invention.

The number of levels used to implement splitting engine 70 may vary depending on, for example, the size of the forwarding database and/or the type of storage device(s) included. If the forwarding database is relatively large, for example, a system designer may implement the splitting engine with more than one level. Other parameters that may be considered when determining the number of splitting engine levels include power and latency. For example, one might increase the number of levels used to implement splitting engine 70 to reduce the total amount of power consumed. On the other hand, the number of splitting engine levels may be decreased/increased to decrease/increase the latency attributable to splitting engine 70.

At least one of the levels may include a TCAM device (i.e., a storage device with a relatively short, fixed latency response) in most embodiments of the invention. In addition to providing relatively short, fixed latencies, TCAM devices may be chosen for their flexibility in storing masked entries. In other words, TCAM devices can be partitioned into memory blocks of fixed size (e.g., 36, 72, 144, 288, etc. bits/block). This enables the variable length pointer entries to be individually stored within appropriately sized memory blocks. Since the pointer entries within a given level of the hierarchical tree structure generally contain the same number of bits, each level of the hierarchical tree structure may provide it's own fixed latency by storing those pointer entries within commonly-sized TCAM blocks.

In one embodiment, a first level storage device (72) may include a block of logic gates and registers, while a second level storage device (74) may include a TCAM device. The block of logic gates and registers may be selected for the first level of the splitting engine, if a vast majority of the pointer entries are stored in subsequent (i.e., lower) levels of the splitting engine. Though RAM devices may be used in alternative embodiments of the invention, their use may be limited to lower levels of the splitting engine (due to the longer latency provided by such devices).

As shown in FIG. 10, splitting engine 70 may construct and maintain a set of pointer entries similar to the manner described in FIG. 9. However, instead of storing only the spear entries, splitting engine 70 may store substantially all pointer entries by forming a different pointer table for each level of tree structure 100. For example, the pointer entries corresponding to nodes T, I, J and K may be stored within one pointer table, whereas the pointer entries corresponding to nodes M and N may be stored within another pointer table. In some cases, the pointer tables may be distinctly divided among the multiple levels of splitting engine 70. For example, pointer tables within the first four levels of tree structure 100 (i.e., tree levels 0-3) may be stored within the first level storage device 72, while pointer tables within the last four levels of tree structure 100 (i.e., tree levels 4-7) may be stored within the second level storage device 74.

However, the pointer tables may not always be so distinctly divided. As shown in FIG. 10, one or more pointer entries within a given pointer table may be stored within a different storage device (and therefore, a different level of the splitting engine) than the remainder of the pointer entries within that pointer table. For example, the pointer entry corresponding to node T may be stored within the first storage device (72), whereas the remainder of the pointer entries in that table (i.e., the pointer entries at nodes I, J and K) may be stored within the second storage device (74). There may also be cases in which one or more pointer entries within a given pointer table are shared between the multiple levels of the splitting engine. For example, the pointer entries corresponding to nodes G and H may each be stored within the first and the second storage devices.

In other words, splitting engine 70 may assign each pointer entry to a particular level of the splitting engine based on, for example, the number of prefix entries under the node (i.e., the "weight" of the node) at which the pointer entry resides. If the weight of the node is relatively high, the pointer entry corresponding to the node may be stored in the first level of the splitting engine. However, if the weight of the node is relatively low, the pointer entry may be stored in a lower level of the splitting engine. Substantially any number of prefix entries may be used to distinguish between the "high" and "low" weight thresholds; however, such numbers are generally dependent on the same factors used to determine the number of levels to be used in the splitting engine.

Therefore, it may be easier to envision the pointer entries as stored within a pointer entry database, portions of which can be located within the first storage device (72), the second storage device (74), or both storage devices. For example, relatively high weight pointer entries may be stored within a first portion 110 of the pointer entry database, while relatively low weight pointer entries may be stored within a second portion 120 of the pointer entry database. Pointer entries within the first portion 110 may be configured for locating a child pointer entry within either of the first or second portions. As such, the pointer entries within the first portion 110 may include a number of bits that is dependent on the level of the hierarchical tree structure at which the pointer entries reside. For example, pointer entries residing at level 3 of tree structure 100 include 3 bits followed by a masked entry (*).

Pointer entries within the second portion 120 may be configured for locating a child pointer entry within the second portion 120 of the pointer entry database, or alternatively, for locating one of the multiple sub-databases of prefix entries within the DPU array. Like the first portion pointer entries, the pointer entries within the second portion 120 may include a number of bits that is dependent on the level of the hierarchical tree structure at which the pointer entries reside. Unlike the first portion pointer entries, however, one or more of the most significant bits of the second portion pointer entries may be "lopped-off" and replaced with a masked entry (*).

In other words, the pointer entries within the second portion 120 may discard the bits that can be attributed to a parent pointer entry residing within a third portion 130 of the pointer entry database. The third portion 130, shown in the cross-hatched regions of FIG. 10, (i) overlaps the first and second portions, (ii) includes the pointer entries that are stored within more than one storage device (e.g., the pointer entries at nodes G and H), and (iii) points to nodes within the second portion 120 of the pointer entry database. In the embodiment of FIG. 10, the pointer entries descending from nodes G and H (e.g., the pointer entries at nodes I, J, K, M, N, P, Q, and S) may each store a masked entry in place of the three bits attributed to nodes G and H. By "lopping-off" these bits, the amount of space needed for storing the pointer entries within second portion 120 is greatly reduced, along with the amount of power and time consumed by search operations conducted within the NSE. The reduction in storage space also increases the capacity of the splitting engine. As described in more detail below, prefix entries within the DPU array may also be stored with a certain number of "lopped-off" bits.

The use of a regular memory structure, such as a Ternary CAM, to implement one or more levels of the splitting engine is made possible through the fact that the splitting engine reduces the search scope in the NSE by dividing a relatively large database into a hierarchy of smaller sub-databases. Since the sub-databases are bound in both size and number, search operations within the NSE may be conducted with a fixed latency for all search key widths. The efficiency of the search operation may be further increased by forming a pointer entry database, i.e., a hierarchy of pointer entries used for navigating through the levels of the splitting engine and the hierarchy of prefix entry sub-databases in the DPU array. The power consumption and latency of the search operation may also be reduced by storing "lopped-off" pointer entries in the pointer entry database and "lopped-off" prefix entries in the DPU array. Thus, after a search key is used to search through one level of the splitting engine, only a remaining portion of the search key may be used for searching through a lower level of the splitting engine, or in one of the prefix entry sub-databases in the DPU array.

FIG. 8 is a block diagram illustrating an exemplary architecture for the data processing units (DPU) shown in FIG. 6. As shown in FIG. 8, a single DPU block (80) may actually comprise several sub-blocks, such as a data storage sub-block (82), a data extractor sub-block (84) and a data processor sub-block (86). In some embodiments, each of the sub-blocks may be entirely housed inside each one of the parallel-fed DPU blocks. However, one or more of the sub-blocks may act as a common component for the DPU array, in other embodiments of the invention. For example, a common data processor may be included for the entire DPU array, or alternatively, a common data extractor and data processor could be used.

After the splitting engine is used to divide the database of prefix entries into the hierarchy of smaller sub-databases, the sub-databases may be stored within the array of DPU blocks shown in FIG. 6. In some cases, a single storage device may be used within the DPU array for storing the hierarchy of sub-databases. In other cases, the hierarchy of sub-databases may be partitioned and stored within multiple storage devices, each of the same or different type. Several types of storage devices may be used within the DPU array, including Content Addressable Memory (CAM or TCAM) and Random Access Memory (SRAM or DRAM), among others.

Similar to the pointer entry database, the DPU array may be constructed as one or more tree levels—where each level can be implemented in a variety of ways, such as with fixed latency memory blocks (i.e., TCAM or SRAM blocks), or a fixed number of accesses to a fixed latency memory block (i.e., TCAM or SRAM blocks). As will be described in more detail below, the generic nature of the data processing units may help in decoupling efficient data storage (made possible by different encoding compression algorithms implemented in control software) and data processing, which is implemented in hardware for high throughput.

In an alternative implementation of the DPU array, the DPU blocks may be implemented in a centralized fashion, instead of the decentralized design described above. For example, instead of processing the DPU blocks in parallel, the DPU blocks could be processed one after another in a pipelined manner. For example, a linear search may be performed in the NSE by replacing the DPU blocks with an array of "Linear Search Node Processing Units" (LPUs). In other words, a DPU is a data processing unit where prefixes are stored in some form and searched. An LPU, on the other hand, is a specific example of DPU, where the prefixes to be searched are stored one by one in a plain format (e.g., no compression of data, etc.). Searches are performed in the LPU by looking through the prefix entries one by one. Alternatively, the DPU blocks may be replaced with an array of TCAM blocks configured for executing the linear search.

Data storage sub-block 82 generally operates to store one or more of the multiple sub-databases of prefix entries A sub-database can also be stored across multiple data storage sub-blocks 82, such that when the shared sub-database is to be searched, all data storage sub-blocks containing any part of the shared sub-database will be searched. In some cases, one or more bits of the prefix entries may be "lopped-off" and replaced with a masked entry (*) before the prefix entries are stored within data storage sub-block 82. For example, each sub-database within the data storage block is associated with a unique pointer entry (or "spear entry") containing some number of bits. To reduce DPU storage requirements, only the bits that follow the unique pointer entry will be stored as prefix entries within the data storage sub-block. The lop-off function enables a lot more entries to be stored in the sub-database storage space, thereby increasing the capacity of the DPU array.

In some cases, the storage requirements may be further reduced by storing encoded or compressed data structures within data storage sub-block 82. For example, a Huffman encoding algorithm may be used for storing the prefix entries in a compressed format; however, substantially any other compression algorithm may be used. The control software performing such database management (e.g., the Search Engine Software in the control plane of FIG. 5) may not only determine the form of the data structures and their location in the sub-block, but may also function to write the prefix entries in the appropriate location. The data storage sub-block could be implemented with embedded SRAMs, DRAMs, or for that matter, any memory technology that gives sufficient density (i.e., memory bandwidth) for a given device capacity target. For example, pseudo-SRAM, flash memory, or magnetic memory may be used to implement the data storage sub-blocks in alternative embodiments of the invention. In some cases, the amount of available memory bandwidth may determine the amount of data that can be extracted and processed, which in turn, may be used to determine the amount of capacity that can be supported in the NSE.

Data extractor sub-block 84 is generally configured for receiving the pointer entry (i.e., "spear entry") sent from the splitting engine, and if the received pointer entry points to a sub-database within the data storage sub-block 82, extracting the sub-database pointed to by the pointer entry. Data extractor sub-block 84 may also be configured for reading data storage sub-block 82, understanding the data structures that have been extracted (i.e., determining whether the prefix entries are compressed or uncompressed), and transforming the extracted data structures (if necessary) to generate an output, which can be processed by the data processor sub-block with high throughput and the least amount of logic possible. The language between the data extractor and data processor may be determined apriori so the data processor can be implemented, in some embodiments, as a high performance, hard-coded block of logic.

The data extractor sub-block may be implemented in a hard-coded fashion (e.g., ASIC gates), in some embodiments of the invention. However, it may be desirable, in some situations, to use a micro-coded engine, Field Programmable Gate Array (FPGA), or even an embedded microprocessor to implement the data extractor. This may provide added flexibility by allowing the control software to change the format of the data structures stored within the data storage sub-block, depending on the characteristics of the database, the relative lengths of the prefix entries, etc. For example, the control software could choose different types of optimizations for different types of databases. The control software could then download the appropriate code into the data extractor sub-blocks to perform the corresponding transformation, which could range from simple decoding to sophisticated decompression techniques.

Data processor sub-block 86 is generally designed for processing the extracted data structures very rapidly and to determine search key "hits" and "misses." As noted above, data extractor sub-block 84 may transform the data structure extracted from the data storage sub-block to a simple data structure that can be read by the data processor sub-block. Though the data processor sub-block is preferably implemented as hard-coded logic, sophisticated implementations may make this block programmable as well. In any case, the data processor sub-block may contain logic for understanding the semantics of the prefix entries, and comparing the prefix entries with a search key to determine the "best match."

Advantages of the NSE architecture described herein include higher capacity and throughput, in addition to fixed latency operation of the search engine, thus allowing the architecture to be designed with a similar interface as that of a conventional TCAM-based search engine. The architecture described herein also allows for searching only those bits that remain in the search key after searching through the pointer table database created by the splitting engine, thus allowing for higher worst case capacity for specific applications, especially within Internet Protocol (IP) Version 4 and Virtual Private Network (VPN) routing tables.

Further advantages of the NSE architecture described herein include a Generic Table-lookup Architecture that can be optimized for high throughput and capacity, especially for forwarding database search operations. Other beneficial characteristics provided by the NSE architecture are low power, high search throughput, high update rates and fixed search latency for all search key widths. The ability to simultaneously achieve desirable values for all of the performance parameters listed above is considered highly advantageous.

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment", "one embodiment," or "an alternative embodiment" in various portions of this specification are not necessarily all referring to the same embodiment. Furthermore, the particular features, structures or characteristics may be combined, as suitable, in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure to aid in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An architecture for a network search engine (NSE) comprising:
   one or more levels of a splitting engine configured for dividing a database of prefix entries into multiple sub-databases, each bounded in size between a minimum value and a maximum value; and
   an array of data processing units (DPUs) coupled to the splitting engine for storing the multiple sub-databases, wherein the one or more levels of the splitting engine are further configured for forming a hierarchical tree structure of the database, wherein the hierarchical tree structure comprises a plurality of nodes extending between a root node and a plurality of leaf nodes, and wherein each of the plurality of leaf nodes corresponds to one of the multiple sub-databases of prefix entries
   wherein the one or more levels of the splitting engine form the hierarchical tree structure by assigning a pointer entry to each of the plurality of nodes within the hierarchical tree structure;
   wherein a first portion of the pointer entries are stored within a first level of the splitting engine in a first storage device, wherein a second portion of the pointer entries are stored within a second level of the splitting engine in a second storage device, and wherein a third portion of the pointer entries, overlapping the first and second portions, are stored within the first and the second storage devices; and
   wherein each of the pointer entries residing within the first and third portions comprises a number of bits that is dependent on the level of the hierarchical tree structure at which the pointer entries respectfully reside.

2. The architecture of claim 1, wherein the one or more levels of the splitting engine comprises at least one storage device for storing at least some of the pointer entries.

3. The architecture of claim 2, wherein the storage device is selected from a group comprising: logic gates and registers, Content Addressable Memory (CAM or TCAM) and Random Access Memory (SRAM or DRAM).

4. The architecture of claim 3, wherein if the splitting engine comprises only one level, the splitting engine is configured for storing only the pointer entries that are assigned to the plurality of leaf nodes within a single pointer table.

5. The architecture of claim 3, wherein if the splitting engine comprises more than one level, the splitting engine is configured for storing all of the pointer entries by forming a different pointer table for each set of pointer entries that reside at each level of the hierarchical tree structure.

6. The architecture of claim 5, wherein each level of the splitting engine comprises the same or a different type of storage device.

7. The architecture of claim 6, wherein each of the pointer entries residing solely within the second portion comprises a number of bits equal to the level of the hierarchical tree structure at which the pointer entries reside minus a number of bits contributed to a parent pointer entry residing within the third portion.

8. The architecture of claim 7, further comprising an interface manager configured for translating a search instruction into a search key and sending the search key to the splitting engine, which responds by sending the search key and a corresponding pointer entry to the array of data processing units.

* * * * *